Nov. 17, 1931.  C. F. HENNEY  1,831,861
REFRIGERATING APPARATUS
Filed April 30, 1928
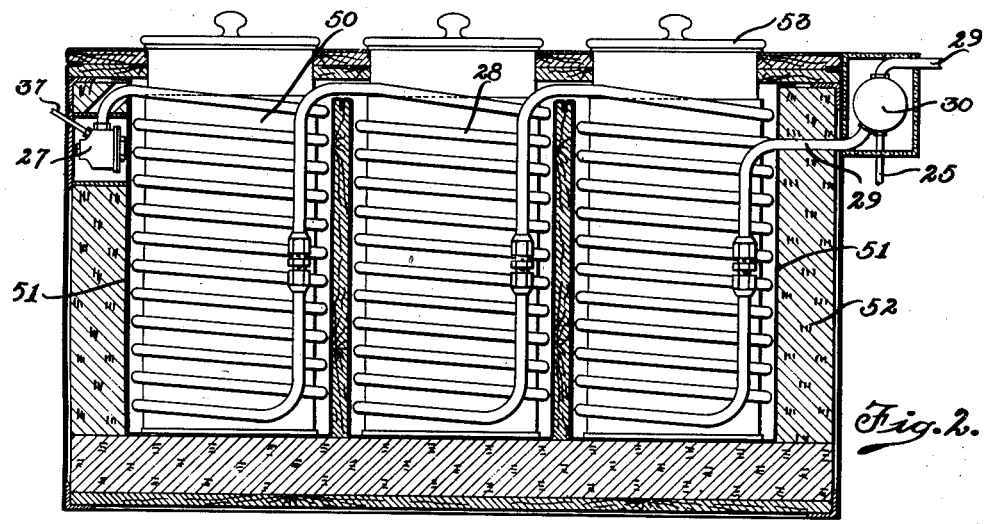
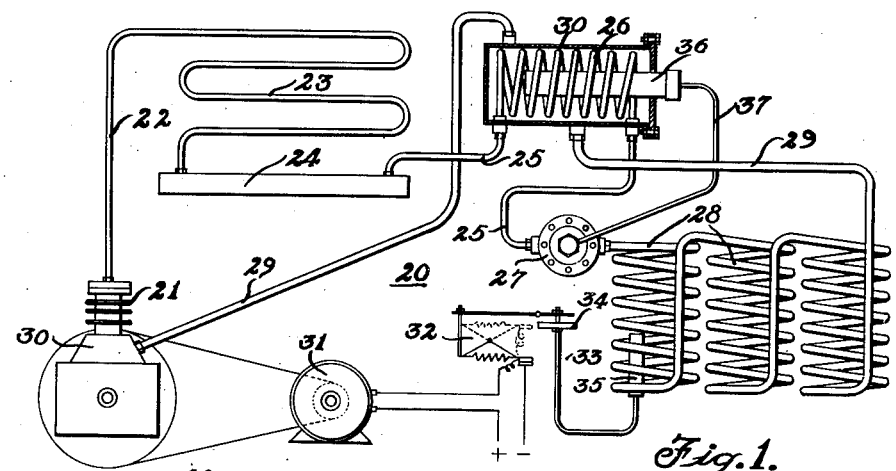
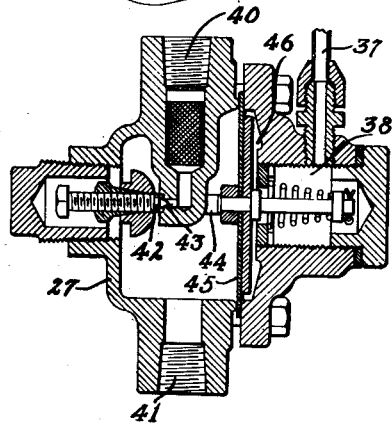

Patented Nov. 17, 1931

1,831,861

UNITED STATES PATENT OFFICE

CHARLES F. HENNEY, OF DAYTON, OHIO, ASSIGNOR TO FRIGIDAIRE CORPORATION, OF DAYTON, OHIO, A CORPORATION OF DELAWARE

REFRIGERATING APPARATUS

Application filed April 30, 1928. Serial No. 273,959.

This invention relates to refrigerating apparatus and more particularly to refrigerating apparatus, preferably of the expansion type, which may be applied to a food storage cabinet, such as an ice cream cabinet.

An object of this invention is to provide a food storage cabinet with a holdover compartment surrounding the food compartment or sleeve.

Another object of this invention is to provide an evaporator surrounding a food storage compartment or sleeve in thermal contact with a holdover compartment.

Another object of this invention is to provide means for automatically modifying the automatic expansion valve in accordance with the character of refrigerant passing out of the evaporator.

Further objects and advantages of the present invention will be apparent from the following description, reference being had to the accompanying drawings, wherein a preferred form of the present invention is clearly shown.

In the drawings

Fig. 1 is a view showing diagrammatically a refrigerating apparatus embodying features of my invention;

Fig. 2 is a cross sectional view of a food storage cabinet embodying features of my invention, and Fig. 3 is an enlarged cross sectional view of an expansion valve which may be used in a refrigerating apparatus embodying features of my invention.

A refrigerating apparatus in which features of my invention may be embodied is generally designated as 20. It may comprise a compressor 21 discharging compressed refrigerant through a pipe 22 leading to a condenser 23. The refrigerant condensed in said condenser may be stored in a receiver 24. These parts may comprise part of the feed line which continues as pipe 25 through a coil 26 to an expansion valve 27. The expansion valve 27 discharges expanded refrigerant into one or more coils 28 which form the evaporator of the system. The evaporator discharges the refrigerant through a return line 29 passing through the overflow trap 30 from whence the return line 29 discharges to the compressor 21, generally in the crankcase 30.

The compressor may be driven by any suitable means, for instance a motor 31 which is automatically started and stopped by a snap switch 32 which in turn is operated by any suitable thermostatic device 33 in thermal relation with any part of the refrigerating apparatus desired. In this instance, the thermostatic device may comprise an expansible bellows 34 and a bulb 35 adjacent one of the coils 28 which together operate the snap switch 32.

The expansion valve 27 is under the influence of an artificial atmosphere. In this case the artificial atmosphere may be enclosed in a bulb 36 placed within the overflow trap 30, and this bulb 36 may be connected by the pipe 37 with the atmospheric side 38 of the expansion valve 27. It is thus seen that the character of the refrigerant being discharged through the pipe 29 modifies the action of the automatic valve 27. If the refrigerant passing through the pipe 29 is too cold, such as in liquid form, the pressure within the bulb 36 automatically chokes the valve 27 to reduce the rate of flow of the refrigerant. In Fig. 3 the automatic valve 27 is shown more or less in detail. The refrigerant enters through the inlet 40 and the expanded refrigerant is discharged through the outlet 41. A needle valve 42 governs the passage of refrigerant through the orifice 43. The needle valve 42 is connected by means of the yoke 44 with the diaphragm 45. The diaphragm 45 is exposed to pressure within the cavity 46, which cavity is connected with the artificial atmosphere in pipe 37 hereinbefore described. It is to be seen that diaphragm 45 is subjected to refrigerant pressures on the outlet side of the refrigerant orifice 43 and also to the pressures of the artificial atmosphere in the pipe 37. Thus when the refrigerant chills the bulb 36 below the desired temperature, the artificial atmosphere contracts and modifies the action of the valve 42 to choke the flow of refrigerant through the orifice 43. While I have shown a particular embodiment of an automatic valve, this particular embodiment is not necessary, in all of its features, for practicing my invention.

A food storage cabinet in which features of my invention may be embodied, may comprise, in general, one or more food storage sleeves or compartments 50. The food storage sleeves 50 may be surrounded and may be in thermal contact with the coils 28 of the evaporator heretofore described. Surrounding the sleeves 50 and the coils 28 may be placed one or more compartments 51. These compartments 51 may be circular or square in cross section and the sleeves 50 also may be circular or square in cross section.

The compartments 51 are adapted to be filled with a holdover, such as a suitable cryohydrate, which may be frozen into a slush during the operation of the compressor. The holdover may supply refrigerant during the period of idleness of the compressor by the melting of the cryohydrate. Insulation 52 may surround the compartments 51 and suitable removable insulated covers 53 may be provided for the various sleeves 50. Under certain conditions the compartment 51 may be left empty in which case it acts as a type of insulation and the refrigerant coils 28 being in thermal contact with the sleeves continue to provide refrigeration for the sleeves. Sufficient clearance may be provided between the walls of the compartments 51 and coils 28 to permit expansion and circulation of the holdover liquid while freezing, thus preventing bursting of the compartments.

Since the coils 28 are in direct thermal or bodily contact with the sleeves 50, formation of ice on the coils does not insulate the sleeves from the coils. Also, when the compartments 51 are allowed to remain empty, refrigeration is provided for the sleeves by the direct thermal or bodily contact of the coils, and the air space in the empty compartments 51 provides further insulation. Thus the same construction may be used to supply the demand for holdover cabinets and the demand for cabinets without holdover.

While the form of embodiment of the invention as herein disclosed constitutes a preferred form, it is to be understood that other forms might be adopted, all coming within the scope of the claim which follows.

What is claimed is as follows:

A refrigerating apparatus comprising a refrigerant compressor, condenser, and evaporator, a feed line connecting at least said condenser and evaporator, an automatic expansion valve in said feed line, a return line between said evaporator and compressor, a refrigerant overflow trap in said return line, said feed line being in thermal contact with said trap, and a member in said trap modifying the action of said expansion valve.

In testimony whereof I hereto affix my signature.

CHARLES F. HENNEY.